Nov. 24, 1953
M. S. TYSON
2,660,083
TILT HEADED TAP BOLT
Filed Jan. 5, 1950
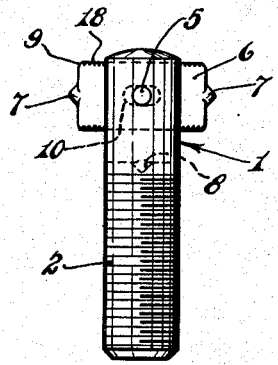
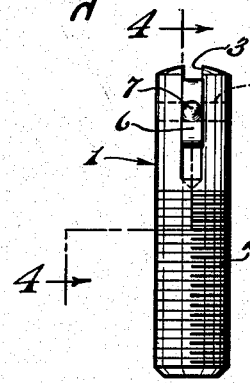
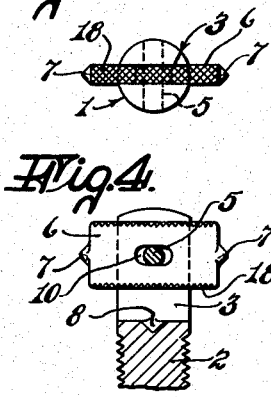
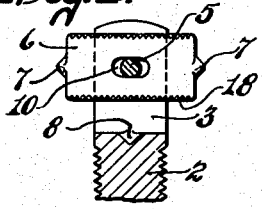
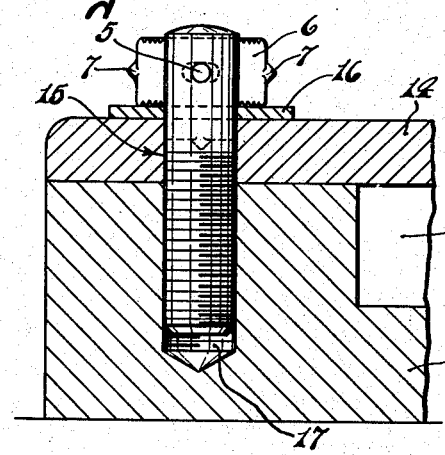
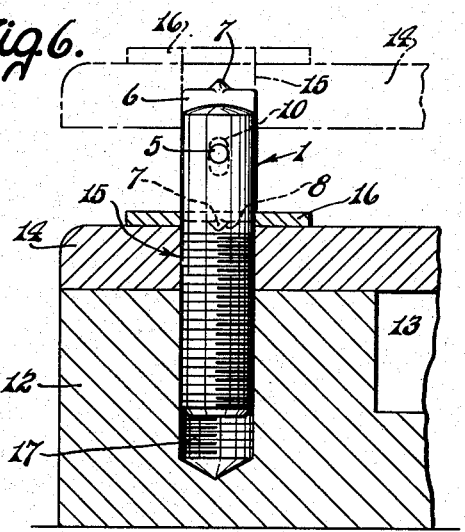
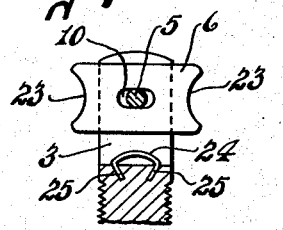
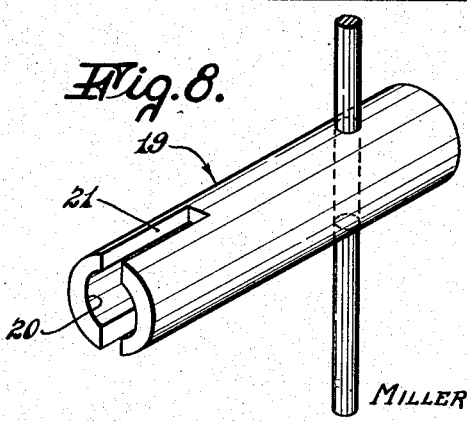
INVENTOR
MILLER S. TYSON
BY Chapin & Neal
ATTORNEYS Patented Nov. 24, 1953

2,660,083

UNITED STATES PATENT OFFICE 2,660,083

TILT HEADED TAP BOLT

Miller S. Tyson, Longmeadow, Mass.

Application January 5, 1950, Serial No. 136,861

1 Claim. (Cl. 85—9)

This invention relates to an improvement in tap bolts. The principal object of the invention is to provide a tap bolt for holding closure plates and similar members in position, and which will permit the speedy removal of such covers without complete removal of the tap bolt from its threaded socket.

A further object is to provide a heavy duty tap bolt having the above advantages which at the same time possesses the strength of a conventionally headed tap bolt made of comparable material.

A further object has in view the provision of a tap bolt which is so constructed as to facilitate the replacement of a cover plate or other secured member.

Other and further objects regarding the details of construction will be made apparent in the following specification and claim.

In various types of machines in general civilian use and in military and warfare equipment, it is customary to enclose various operating parts in protective housing which are provided with numerous inspection surface openings which are closed by plates held in place by machine screws or tap bolts. Where the opening is of sufficient extent a large number of such bolts may be required to adequately hold the covering plates. With conventionally headed bolts it is necessary to completely remove the several bolts before the cover can be removed for the desired inspection or service. Furthermore, a substantial care has to be exercised to avoid losing one or more of the bolts before replacement of the cover is desired. The replacing of the cover requires positioning and rethreading all of the bolts. Where time is a critical factor as in the servicing of equipment under emergency or battle conditions, the time and care required to remove, replace and secure the cover, where conventional bolts are used, may determine the successful utilization of the equipment itself.

In the accompanying drawings,

Fig. 1 is a front elevation of a top bolt embodying the present invention;

Fig. 2 is a side elevational view of the structure shown in Fig. 1;

Fig. 3 is a plan view;

Fig. 4 is a sectional view substantially on line 4—4 of Fig. 2;

Fig. 5 is a view showing the tap bolt of Fig. 1 in cover securing position, parts being broken away;

Fig. 6 is a similar view showing the parts in cover removing position;

Fig. 7 is a fragmentary view similar to Fig. 4 but showing a modified structure; and Fig. 8 is a generally perspective view of a wrench for the tightening and release of the upper tap screw, such as is shown in Fig. 1.

Referring to the drawings, the bolt is shown as comprising a cylindrical member generally indicated at 1, one end portion of which is threaded as at 2. The other end portion is formed with a kerf 3 which extends transversely diametrically of the cylindrical member, and as shown extends axially to the adjacent end of the threaded portion 2. Under some circumstances the threads 2 may extend upwardly of the bottom of the kerf or the bottom of the kerf may be spaced from the adjacent end of the threaded portion. But for most purposes, the bottom of the kerf is preferably located at the adjacent end of the thread portion.

Extending diametrically across and within the kerf is a pin 5 which is secured in openings drilled or otherwise formed in the cylinder. Transversely positioned and pivotally mounted within the kerf is a head member 6. Preferably, and as shown, the head member 6 is generally rectangular in form and of a thickness to substantially fill the space between the walls of the kerf while permitting free turning of the member in the kerf. The opposite ends of the head member are provided with projections 7, and the bottom or floor of the kerf is formed with a recess 8. The corners of the head are slightly rounded as at 9. The mounting of the head 6 on the pin 5 comprises an elongated slot 10, extending longitudinally of the head and of a width just sufficiently greater than the diameter of the pin to permit free pivotal and sliding movement relative to the pin. The slot 10 is so positioned that head 6 may be turned on pin 5 to bring the major axis of the head into alignment with the cylindrical member. The length of slot 10 permits the head to be moved axially a sufficient distance, at least, to seat and unseat projection 7 in and from the recess 8. The longitudinal movement permitted head 6 by the slot also minimizes the depth of kerf 3 necessary to permit the head to be pivoted into alignment with the cylinder.

As shown in Fig. 6, the bolt is shown threaded into the body of a housing member 12 having an opening 13 closed by the plate 14. The head member 6 has been turned into position where its major axis is in alignment with the axis of the cylindrical member and one of the projections 7 is seated in the recess 8 preventing pivotal movement of the head about the pin. In this position the cover plate 14, which is provided with a smoothly bored opening 15, of a diameter only slightly larger than cylinder 1 may be freely moved to and from its position on the bolt. If desired, a washer 16 may be placed over the bolt as shown in Fig. 6. In Fig. 6 the bolt has been turned from its threaded socket 17 only sufficiently to bring the bottom of the kerf 3 above the surface of the cover 14 of washer 6.

As will be apparent, when all of the cover securing bolts have been moved to the position of Fig. 6, the cover plate 14 may be freely withdrawn from the bolts, the latter remaining threaded in the housing 12 safe from loss. Furthermore, the projecting heads 6 of the bolts serve as guides for replacing the cover in proper position and thereby facilitate and speed up the replacing of the cover. With the cover in position, the head member 6 is drawn axially of the bolt to unseat the projection 7 and recess 8. Preferably, the longitudinal edge surfaces of the head member are knurled as at 18 to facilitate gripping the head member to facilitate withdrawal of the projection 7 from the recess 8. When the projection 7 has been unseated the head member is pivoted into a position at right angles to the cylindrical member, as shown in Figs. 1 and 4. In tightening or loosening the tap bolt of the present invention a wrench such as is shown in Fig. 8 is preferably employed. As shown in the latter figure, the wrench comprises a member 19 provided with a central bore 20 of a diameter to closely accommodate the cylindrical portion of the bolt and a transverse diametrically positioned slot 21 in which the sidewise extending end portions of the head member engage. In the exacting uses for which the bolt of the present invention is adapted, substantial pressure is required to properly tighten or loosen the bolt. The above described wrench applies the necessary turning force most efficiently and in a manner best calculated to properly distribute the stresses incident to the tightening or loosening of the bolt. Since the faces of the slot 21 engage the extending portions of the head close to the cylindrical member any bending movement is eliminated or minimized, the turning force applied through the wrench being imposed as shown on the head member. By rotating the wrench 19 the bolt may be turned into the threaded socket 17 to cause the end portions of the transversely extending head 6 to engage the plate 14, or washer 16 if the latter is used, and draw the cover into tight engagement with the housing 12.

For heavy duty the parts are made of hardened steel. The pressures which the head of tap bolts are called upon to sustain in the exacting services in which the bolt of the present invention is intended to be used are substantial. The applied pressure as transmitted from the cylindrical member to the head in tightening the bolt, imposes a shearing stress on pin 5, bending stresses on the portion of the head between the pin and the bottom of the kerf, and compression in the portion of the head between the pin and the free end of the cylinder. To get maximum strength from the material the head 6 should be of a thickness to substantially fill the kerf to avoid any bending moment on the pin. While the actual dimensions will vary depending on the work the bolt is to be called on to do and the character of the metal used, dimensions of the following order have been found satisfactory for a bolt made of hardened steel from cylindrical stock of 3/8" diameter and intended to sustain loads up to 400-inch pounds:

| | |
|---|---|
| Pin diameter | .039–.094 |
| Head thickness | 3/32" |
| Head width | 3/8" |
| Head length | 5/8" |
| Slot width | .095–.096 |
| Slot length | .175 |

Various modifications may be made in the structure without departing from the invention. For example, as shown in Fig. 7, the ends of head 6 instead of carrying a locking projection may be recessed as at 23, and the floor of the kerf 3 may be provided with a projecting member to engage in such recess. As shown in Fig. 7, such member may take the form of a wire spring member 24 having its ends engaging in inclined openings 25 in the floor of the kerf. While as shown in the latter figure, the head 6 is mounted in the kerf 3 by a pin and slot arrangement, as shown in the other figures, the slot functions in this form merely to minimize the depth of the kerf. The spring member yields sufficiently to permit engagement and disengagement of the locking members without axial movement of the head on its pin so that only a pivotal movement of the head need be provided.

What I claim is:

A tap bolt comprising a cylindrical member provided at one end with a head for tightening and loosening the bolt which comprises an open ended diametrically extending kerf, a pin extending transversely of the kerf and diametrically of the cylindrical member, a substantially rectangular head member pivoted on said pin within the kerf by means of a slot extending centrally and longitudinally of the head member, said head member being of a length greater than, and a width substantially equal to, the diameter of the unthreaded portion of the cylindrical member, the thickness of the head member being substantially equal to one-quarter of the diameter of the cylindrical member and sufficient to substantially fill the kerf while permitting frictional pivot movement of the head on the pin, a projection formed on each end of the head member, a recess formed in the floor of the kerf in which one of said projections is adapted to engage when the head member is in axial alignment with the cylindrical member, the length of said slot being only sufficient to seat and unseat the projection in and from said recess, said cylindrical member being machine threaded at least from the floor of the kerf to the opposite end of the cylindrical member to permit the head member to exert bolt head clamping pressure, when pivoted to a position transversely of the cylindrical member, upon tightening of the bolt.

MILLER S. TYSON.

References Cited in the file of this patent

UNITED STATES PATENTS

| Number | Name | Date |
|---|---|---|
| 74,966 | Williamson | Feb. 25, 1868 |
| 464,373 | Lampkin | Dec. 1, 1891 |
| 513,182 | Grubb et al. | Jan. 23, 1894 |
| 855,029 | Walsh | May 28, 1907 |
| 2,015,376 | Broadhead | Sept. 24, 1935 |
| 2,124,658 | Smith | July 26, 1938 |

FOREIGN PATENTS

| Number | Country | Date |
|---|---|---|
| 552,100 | Great Britain | Mar. 23, 1943 |